(12) United States Patent
Guo et al.

(10) Patent No.: US 6,294,607 B1
(45) Date of Patent: Sep. 25, 2001

(54) ULTRA-HIGH-SOLIDS ACRYLIC COATINGS

(75) Inventors: Shao-Hua Guo, West Goshen; Daniel B. Pourreau, Exton; Wei Wang, Boothwyn, all of PA (US)

(73) Assignee: Arco Chemical Technology, L.P., Greenville, DE (US)

( * ) Notice: Subject to any disclaimer, the term of this patent is extended or adjusted under 35 U.S.C. 154(b) by 0 days.

(21) Appl. No.: 09/391,562

(22) Filed: Sep. 8, 1999

(51) Int. Cl.⁷ .............................. C08J 3/00; C08K 3/20; C08L 75/00; C08L 61/00; C08F 8/00

(52) U.S. Cl. .................. 524/507; 525/100; 525/101; 525/123; 525/125; 525/127; 525/154; 525/155; 525/157; 525/455

(58) Field of Search .................. 525/100, 101, 525/123, 125, 127, 154, 155, 157, 455; 524/507

(56) References Cited

U.S. PATENT DOCUMENTS

| | | | |
|---|---|---|---|
| 3,998,768 | * 12/1976 | Pettit, Jr. | |
| 4,076,766 | * 2/1978 | Simms | 260/850 |
| 4,276,212 | 6/1981 | Khanna et al. | 260/39 |
| 4,368,297 | 1/1983 | Kato et al. | 525/342 |
| 4,501,868 | 2/1985 | Bouboulis et al. | 526/208 |
| 4,510,284 | 4/1985 | Gimpel et al. | 524/379 |
| 4,518,726 | 5/1985 | Kato et al. | 524/32 |
| 5,244,696 | 9/1993 | Hazan et al. | 427/402 |
| 5,382,642 | 1/1995 | Guo | 526/333 |
| 5,444,141 | 8/1995 | Guo | 526/347 |
| 5,475,073 | 12/1995 | Guo | 526/333 |
| 5,646,213 | 7/1997 | Guo | 524/562 |
| 5,731,377 | * 3/1998 | Friel | 524/522 |

* cited by examiner

*Primary Examiner*—Patrick D. Niland
(74) *Attorney, Agent, or Firm*—Shao Guo

(57) ABSTRACT

An ultra-high solids coating composition is disclosed. The composition comprises a polyol blend of a liquid acrylic polyol and a resinous polyol. The polyol blend is crosslinked with a multifunctional isocyanate, melamine, or silane to form a variety of coatings. The coating composition has a significantly higher solid % than that is formulated from a single resin that has similar composition of the combination of the polyol blend. The coatings include less than about 35% by weight of an organic solvent.

20 Claims, No Drawings

ULTRA-HIGH-SOLIDS ACRYLIC COATINGS

FIELD OF THE INVENTION

The invention relates to an acrylic coating composition. More particularly, the invention relates to an ultra-high-solids acrylic coating composition derived from a polyol blend that comprises a liquid acrylic polyol and a resinous polyol having a $T_g$ greater than 25 ° C.

BACKGROUND OF THE INVENTION

Hydroxy-functional acrylic resins have been widely and increasingly used in high performance coatings, particularly in automotive topcoats, due to their excellent durability and outstanding physical properties. They are usually crosslinked with a multifunctional isocyanate or a melamine to form acrylic-urethane or acrylic-melamine coatings.

Hydroxy-functional acrylic resins are usually copolymers of a hydroxyalkyl acrylate or methacrylate and one or more ordinary alkyl acrylates or methacrylates. Commonly used hydroxyalkyl acrylates and methacrylates include hydroxyethyl acrylate (HEA), hydroxypropyl acrylate (HPA), hydroxyethyl methacrylate (HEMA), and hydroxypropyl methacrylate (HPMA).

Usually, a combination of two types of ordinary alkyl acrylates and methacrylates are used to achieve optimal resin properties. The first type are acrylates and methacrylates whose homopolymers have low glass transition temperatures ($T_g$ below 25° C.), e.g., n-butyl acrylate ($T_g$ : −54° C.), n-butyl methacrylate ($T_g$ : 20° C.), and 2-ethylhexyl methacrylate ($T_g$ : −10° C.). The second type includes acrylates and methacrylates whose homopolymers have high $T_g$ s (greater than 50° C.), such as methyl methacrylate ($T_g$ : 100° C.). Styrene is also often incorporated into acrylic resins as a high $T_g$ monomer ($T_g$ : 99° C.). High $T_g$ monomers increase the coating's gloss and hardness, while low $T_g$ monomers impart toughness and flexibility.

In general, high-solids acrylic resins have a hydroxyl number from 60 to 160 mg KOH/g, and a number average molecular weight (Mn) from 1,000 to 5,000. Lowering the molecular weight of the hydroxy-functional acrylic resin can reduce its solution viscosity. This is desireable because it reduces the amount of solvent required to make the coatings sprayable. Solvents are regulated as volatile organic compounds (VOCs) by the U.S. EPA and most coatings have VOC content limits imposed on them. However, the molecular weight reduction must be compensated by an increase in resin hydroxyl number to maintain the coating performance. The increased hydroxyl number increases hydrogen bonding within the resin which increases viscosity. The current solids level of sprayable acrylic-urethane or acrylic-melamine coatings is about 50% to 55% by weight.

Newly developed hydroxyl acrylic resins from allylic alcohols have significantly reduced viscosity, and their melamine and urethane coatings can achieve about 60% solids (see, e.g., U.S. Pat. No. 5,646,213). However, ultra-high-solids (65%–70%) acrylic-urethane and acrylic-melamine coatings are needed.

SUMMARY OF THE INVENTION

The invention is an ultra-high-solids coating composition. The coating is formulated from a polyol blend that comprises a liquid acrylic polyol and a resinous polyol. The liquid polyol has Mn within the range of about 500 to about 10,000, hydroxyl number within the range of about 20 mg KOH/g to about 500 mg KOH/g, and $T_g$ within the range of about −70° C. to about 0° C. The resinous polyol has Mn within the range of about 500 to about 10,000, hydroxyl number within the range of about 20 mg KOH/g to about 500 mg KOH/g, and $T_g$ greater than about 25° C. The ultra-high-solids coating also includes a crosslinker selected from multifunctional isocyanates, melamines, and silanes. It uses less than about 35% by weight of an organic solvent, i.e., greater than about 65% by weight of solids at a viscosity of about 95 centistokes at 25° C.

The invention includes an A-B two-component ultra-high-solids acrylic-urethane coating. Component A comprises a blend of a liquid acrylic polyol and a resinous polyol as described above. Component B comprises a multifunctional isocyanate selected from 1,6-hexamethylene diisocyanate (HDI), polymeric HDIs, isophorone diisocyanate (IPDI), polymeric IPDIs, and HDI- or IPDI-based isocyanate-terminated prepolymers of polyethers, polyesters, or acrylic resins. The ratio of OH equivalent in Component A/NCO equivalent in Component B is within the range of 0.8 to 1.2, and the solids % of the combination of Components A and B is greater than about 65% by weight at a viscosity of about 95 centistokes at 25° C.

The invention also includes an ultra-high solids acrylic-melamine coating. The coating comprises a blend of liquid acrylic polyol and a resinous polyol as described above, a melamine crosslinker, and an organic solvent. The ratio of the polyol blend/melamine is within the range of 1/1 to 15/1 by weight. The coating has a solids % greater than about 65% by weight at a viscosity of about 95 centistokes at 25° C.

We have surprisingly found that the coating compositions of the invention have a significantly higher solids % at the same viscosity than that of coatings formulated from a single resin whose composition and molecular weight are similar to the polyol blend.

DETAILED DESCRIPTION OF THE INVENTION

Ultra-high-solids acrylic coatings of the invention comprise a polyol blend, a crosslinker, an organic solvent, and an optional crosslinking catalyst.

The polyol blend comprises a liquid acrylic polyol and a resinous polyol. The liquid acrylic polyol has a number average molecular weight (Mn) within the range of about 500 to about 10,000, a hydroxyl number about 20 mg KOH/g to about 500 mg KOH/g, and a glass transition temperature ($T_g$) about −70° C. to 0 ° C. The liquid acrylic polyol preferably comprises recurring units of a hydroxyl functional monomer. The hydroxyl functional monomer is used in an amount sufficient to give the polyol the desired hydroxyl number. It is preferably used in an amount within the range of about 2% to about 60% by weight of the liquid polyol.

The hydroxyl functional monomer is preferably selected from allylic alcohols, alkoxylated allylic alcohols, hydroxyalkyl acrylates and methacrylates, and the like, and mixtures thereof. Examples include allyl alcohol, methallyl alcohol, propoxylated allyl alcohol, ethoxylated allyl alcohol, hydroxyethyl acrylate, hydroxypropyl acrylate, hydroxyethyl methacrylate, and hydroxypropyl methacrylate. Allylic alcohols, alkoxylated allylic alcohols, and hydroxyalkyl acrylates are preferred because they offer the liquid polyol lower $T_g$ than hydroxyalkyl methacrylates. Lowering $T_g$ usually reduces viscosity of the liquid polyol. Monomers having a secondary OH group such as propoxylated allylic alcohols are also preferred. These monomers contribute low viscosity to the liquid polyol compared to those having primary OH group due to weak hydrogen bonding. Secondary hydroxyl functionality is also preferred in ultra-high-solids systems because it slows the curing rate and extends pot life. Allyl alcohol monopropoxylate is most preferred due to its secondary OH functionality and the low $T_g$ of its homopolymer. A mixture of secondary and primary OH monomers may be used to achieve low viscosity, acceptable pot life, and fast drying of the coating.

The liquid acrylic polyol preferably comprises also recurring units of one or more $C_1$ to $C_{20}$ alkyl acrylates or methacrylates whose homopolymers have a $T_g$ below 25° C. It is important to select an acrylate or methacrylate that has low homopolymer $T_g$ because otherwise the liquid polyol would have a high $T_g$ and would not stay liquid at room temperature. Examples of suitable commercial alkyl acrylates and methacrylates include n-butyl acrylate, n-butyl methacrylate, lauryl acrylate, lauryl methacrylate, tridecyl acrylate, tridecyl methacrylate, 2-ethylhexyl acrylate, 2-ethylhexyl methacrylate, and the like, and mixtures thereof. The proportion of recurring units of $C_1$ to $C_{20}$ alkyl acrylates or methacrylates in the liquid acrylic polyol depends on many factors, but most important among these are the desired hydroxyl number and $T_g$ of the resin. Generally, it is preferred to incorporate an amount of C, to $C_{20}$ alkyl acrylates or methacrylates into the liquid polyol in an amount within the range of about 40% to about 98% by weight.

Optionally, the liquid acrylic polyol incorporates a third monomer. The third monomer is selected from vinyl aromatics, vinyl halides, vinyl ethers, vinyl esters, unsaturated nitriles, acrylic and methacrylic acids, conjugated dienes, and mixtures thereof. Incorporation of the third monomer may reduce raw material cost or modify the polyol properties. For example, incorporating styrene into the liquid polyol reduces the cost because styrene is less expensive. Incorporating acrylic or methacrylic acid may make the liquid polyol water soluble or dispersible.

The liquid acrylic polyol is preferably prepared by a suitable free-radical polymerization process. U.S. Pat. No. 5,475,073, the teachings of which are incorporated herein by reference, describes a preferred process for making hydroxy-functional acrylic resins by using allylic alcohols or alkoxylated allylic alcohols. Generally, the allylic monomer is added into the reactor before the polymerization starts. Usually the acrylate or methacrylate is gradually fed during the polymerization. It is preferred to add at least about 50% by weight, preferably at least about 70% by weight, of the acrylate or methacrylate to the reaction mixture gradually. Preferably, the acrylate or methacrylate is added at such a rate as to maintain its steady, low concentration in the reaction mixture. Preferably, the ratio of allylic monomer to acrylate or methacrylate is kept essentially constant; this helps to produce a resin having a relatively uniform composition. Gradual addition of the acrylate or methacrylate enables the preparation of a liquid acrylic polyol having sufficiently low molecular weight and sufficiently high allylic alcohol or alkoxylated allylic alcohol content. Generally, it is preferred to add the free-radical initiator to the reactor gradually during the course of the polymerization; it is also desirable to match the addition rate of the free-radical initiator to the addition rate of the acrylate or methacrylate monomer.

With hydroxyalkyl acrylates or methacrylates, a solution polymerization is preferably used. The polymerization, as taught in U.S. Pat. Nos. 4,276,212, 4,510,284, and 4,501,868, the teachings of which are incorporated herein by reference, is generally conducted at the reflux temperature of the solvent. The solvents preferably have a boiling point within the range of about 90° C. to about 180° C. Examples of suitable solvents are xylene, n-butyl acetate, methyl amyl ketone (MAK), and propylene glycol methyl ether acetate (PMAc). Solvent is charged into the reactor and heated to reflux temperature, and thereafter monomer and initiator are gradually added to the reactor.

Suitable liquid acrylic polyols include copolymers of n-butyl acrylate and allyl monopropoxylate, n-butyl acrylate and allyl alcohol, n-butyl acrylate and hydroxyethyl acrylate, n-butyl acrylate-hydroxylpropyl acrylate, 2-ethylhexyl acrylate and allyl propoxylate, 2-ethylhexyl acrylate and hydroxypropyl acrylate, and the like, and mixtures thereof.

The resinous polyol of the polyol blend has Mn within the range of about 500 to about 10,000, hydroxyl number about 20 mg KOH/g to about 500 mg KOH/g, and $T_g$ greater than about 25° C. The resinous polyol preferably comprises recurring units of a hydroxy-functional monomer as described above. Unlike for the liquid acrylic polyol, the hydroxyl-functional monomers for the resinous polyol preferably have high homopolymer $T_g$ and primary OH groups. Preferred hydroxy-functional monomers for the resinous polyols include allyl alcohol, ethoxylated allyl alcohol, methallyl alcohol, hydroxyethyl acrylate, and hydroxyethyl methacrylate. The hydroxyl-functional monomer is used in an amount sufficient to give the resinous polyol the desired hydroxyl number. It is usually used in an amount within the range of about 2% to about 60% by weight of the resinous polyol composition.

The resinous polyol preferably comprises also recurring units of a comonomer whose homopolymer has $T_g$ greater than about 25° C. The comonomer is preferably selected from vinyl aromatics, $C_1$ to $C_{20}$ alkyl, aryl, and cyclic acrylates or methacrylates. Examples of suitable comonomers include styrene, α-methyl styrene, p-methyl styrene, t-butyl styrene, methyl methacrylate, t-butyl methacrylate, iso-butyl methacrylate, benzyl methacrylate, cyclohexyl methacrylate, tetrahydrofuryl methacrylate, and iso-bornyl methacrylate, and the like, and mixtures thereof. The aromatic, acrylate, or methacrylate comonomer is commonly the major component in the resinous polyol. The amount used depends on many factors, particularly the desired $T_g$ and hydroxyl number of the polyol. Preferably, the resinous polyol comprises an amount within the range of about 50% to about 90% by weight of recurring units derived from the aromatic, acrylate, or methacrylate comonomer; a more preferred range is from about 60% to about 80% by weight.

Other ethylenic monomers are optionally included in the resinous polyols to modify or improve end-use properties such as surface gloss, hardness, chemical resistance, and other properties. Preferred ethylenic monomers include unsaturated nitriles, vinyl esters, vinyl ethers, vinyl halides, vinylidene halides, acrylic and methacrylic acids, acrylamide and methacrylamide, conjugated dienes, and the like, and mixtures thereof. Suitable ethylenic monomers include, for example, acrylonitrile, vinyl acetate, vinyl methyl ether, vinyl chloride, vinylidene chloride, acrylic acid and methacrylic acid, 1,4-butadiene, and the like.

Suitable resinous polyols include, for example, copolymers of styrene and allyl alcohol, styrene and allyl propoxylate, methyl methacrylate and allyl alcohol, methyl methacrylate and allyl propoxylate, t-butyl methacrylate and allyl alcohol, t-butyl methacrylate and allyl propoxylate, styrene and hydroxyethyl acrylate, styrene and hydroxyethyl methacrylate, and the like, and mixtures thereof. Commercially available copolymers of styrene and allyl alcohol, such as SAA-100, SM-101, and SAA-103 (products of Lyondell Chemical Company), are preferred resinous polyols.

Methods for preparing the resinous polyols are similar to those for the liquid acrylic polyols described above. U.S. Pat. Nos. 5,382,642 and 5,444,141 teach how to prepare styrene-allyl propoxylate copolymers and styrene-allyl alcohol copolymers; their teachings are incorporated herein by reference.

The liquid acrylic polyol and the resinous polyol are blended by any suitable means. They can be blended prior to or during coating formulation. They can be blended as neat resins or as solutions. They can be also blended by a sequential polymerization, i.e., one is made after the other in the same reactor. The ratio of the liquid acrylic polyol to the resinous polyol is determined by many factors, particularly the desired coating properties. When more resinous polyol is used, the final coating is harder and dries faster. Generally, the ratio is from 5/95 to 95/5 by weight, preferably within the range of 10/90 to 90/10 by weight.

In addition to the polyol blend, the ultra-high-solids coatings of the invention include a crosslinker. The crosslinker is a polyisocyanate, a silane, or a melamine compound. When a polyisocyanate crosslinker is used, the product is an acrylic-urethane coating; when a melamine crosslinker is used, the product is an acrylic-melamine coating.

Polyisocyanate crosslinkers useful for making acrylic-urethane coatings of the invention include diisocyanates, polyisocyanates, and isocyanate-terminated prepolymers that are well known in the polyurethane industry. Isocyanate-terminated prepolymers are made in the usual way from a diisocyanate or polyisocyanate and a polyether polyol, polyester polyol, acrylic polyol, or the like. Suitable polyisocyanates for use include those commonly used in the polyurethane industry. Aliphatic polyisocyanates are preferred for improved weatherability but aromatic isocyanates are preferred for moisture-curable systems. Preferred polyisocyanates include, for example, 1,6-hexamethylene diisocyanate (HDI), polymeric HDIs, isophorone diisocyanate (IPDI), polymeric IPDIs, and IPDI- or HDI-based isocyanate-terminated prepolymers such as, for example, AIRTHANE ASN-540M prepolymer (product of Air Products). Optionally, a low molecular weight chain extender (diol, diamine, or the like) is included in making the high-solids coating.

The urethane-acrylic coating is formulated at any desired NCO index, but it is preferred to use a NCO index close to 1. If desired, all of the available NCO groups are reacted with hydroxyl groups from the polyol blend and any chain extenders. Alternatively, an excess of NCO groups remain in the product, as in a moisture-cured polyurethane. Example 3 below illustrates how to make a urethane-acrylic clearcoat of the invention.

Melamine-acrylic coatings of the invention are made by reacting the polyol blend with a melamine compound. Suitable melamine compounds for use in making ultra-high-solids coatings of the invention include commercial grade hexamethoxymethylmelamines, such as, for example, CYMEL 303, CYMEL 370 and CYMEL 325 crosslinkers (products of Cytec).

A silane crosslinker can also be used to make a coating of the invention. Suitable silane crosslinkers are known in the art, and are taught, for example, in U.S. Pat. Nos. 4,368,297, 4,518,726, and 5,244,696, the teachings of which are incorporated herein by reference. Suitable silane crosslinkers include, for example, copolymers of unsaturated monomers (e.g., acrylates) and alkoxysilanes having olefin or acrylate functionality (e.g., vinylalkoxysilanes or acrylatoalkoxysilanes).

Ultra-high-solids coatings of the invention include less than about 35% by weight of an organic solvent whereby the solution has viscosity of about 95 centistokes at 25° C. Thus, the solids content of the coating formulations is greater than about 65% by weight. Suitable solvents include, for example, ethers, esters, ketones, aromatic and aliphatic hydrocarbons, alcohols, glycol ethers, glycol ether esters, and the like, and mixtures thereof. Ketones, ethers, esters, aromatic hydrocarbons, and mixtures thereof, are preferred.

The ultra-high-solids coatings optionally include a crosslinking catalyst, which allows curing to occur at relatively low temperatures. The catalyst is used in an amount effective to produce a cured coating under the conditions used to apply and cure the coating. The type of crosslinking catalyst used depends on the type of coating made. Acrylic-urethane coatings use catalysts commonly known in the polyurethane art for catalyzing the reaction of polyol hydroxyl groups and isocyanate groups. Preferred catalysts are amine, organozinc, and organotin compounds such as, for example, stannous octoate, dibutyltin dilaurate, and the like. For acrylic-melamine coatings, an organic sulfonic acid such as p-toluenesulfonic acid is the preferred crosslinking catalyst, although other acidic compounds such as sulfuric acid may be used. Organotin compounds are commonly used with silane crosslinkers. The amount of catalyst used in the coating depends on many factors, but is typically present in an amount within the range of about 0.0001 to about 5% by weight.

We surprisingly found that using a polyol blend of a liquid acrylic polyol and a resinous polyol gives coatings significantly lower viscosity at the same solids level, or much higher solids level at the same viscosity compared to conventional high-solids acrylic coatings with comparable coating physical properties.

The following examples merely illustrate the invention. Those skilled in the art will recognize many variations that are within the spirit of the invention and scope of the claims.

EXAMPLE 1

Preparation of Liquid Acrylic Polyol

A five-liter stainless-steel reactor equipped with agitator, oil heating jacket, temperature controller, nitrogen purge device, vacuum distillation device, and pumps for monomers or initiator, is charged with allyl alcohol monopropoxylate (655 g). Butyl acrylate purged with nitrogen (1410 g) is charged to the monomer addition pump. t-Butyl hydroperoxide purged with nitrogen (205 g, 70% aqueous solution) is charged to the initiator addition pump. The reactor is purged three times with nitrogen, sealed, and the contents are heated to 145° C. Butyl acrylate and initiator are added to the reactor gradually at a decreasing rate over 6 hours while maintaining the reaction temperature at 145° C. The addition rate of butyl acrylate is: hour 1: 300 g; hour 2: 285 g; hour 3: 250 g; hour 4: 225 g; hour 5: 200 g; and hour 6: 150 g. The addition rate of the initiator is hour 1: 39 g; hour 2: 36.5 g; hour 3: 32 g; hour 4: 29.5 g; hour 5: 26 g; and hour 6: 20 g. The reaction mixture is kept at 145° C. for another 0.5 hour following monomer and initiator addition.

Unreacted monomers are removed by vacuum distillation (maximum temperature: 150° C.). The resin is discharged from the reactor at 50° C. The liquid polyol (1394 grams) is collected with a total monomer conversion of 98.9%. It has composition: 25% allyl alcohol monopropoxylate units and 75% butyl acrylate units, number average molecular weight (Mn): 2830, molecular weight distribution (Mw/Mn): 2.47, hydroxyl number: 121 mg KOH/g, Brookfield viscosity at 25° C.: 23600 cps, and $T_g$: −48° C.

EXAMPLE 2

Preparation of Resinous Acrylic Polyol

The reactor as described in Example 1 is charged with allyl alcohol (690 g). t-Butyl methacrylate (1070 g) and styrene (340 g) are mixed, and the mixture is purged with nitrogen and charged into the monomer pump. Di-t-butyl peroxide (DTBP, 183 g) is purged with nitrogen and charged to the initiator pump. The reactor is purged three times with nitrogen, sealed, and the contents are heated to 145° C. Monomer mixture and initiator are added to the reactor gradually at a decreasing rate over 6 hours while maintaining the reaction temperature at 145° C. The addition rate of monomer mixture is hour 1: 300 g; hour 2: 285 g; hour 3: 250 g; hour 4: 225 g; hour 5: 200 g; and hour 6: 150 g. The addition rate of the initiator is hour 1: 39 g; hour 2: 36.5 g; hour 3: 32 g; hour 4: 29.5 g; hour 5: 26 g; and hour 6: 20 g. The reaction mixture is kept at 145° C. for another 0.5 hour following monomer and initiator addition. Unreacted monomers are removed by vacuum distillation (maximum temperature, 150° C.). The resin is discharged from the reactor at 110° C. The resinous polyol (1682 grams) is collected with a total monomer conversion of 80%. It has composition: 22% allyl alcohol units, 19% styrene units, and 59% t-butyl methacrylate units, Mn: 1590, Mw/Mn: 2.34, hydroxyl number: 192 mg KOH/g, and $T_g$: 50° C.

EXAMPLE 3

Urethane-Acrylic Coating With 80/20 Blend of Liquid Acrylic Polyol/Resinous Acrylic Polyol Liquid acrylic polyol of Example 1 (80 g) and resinous acrylic polyol of Example 2 (20 g) are blended. The polyol blend represents a composition of 4.4% allyl alcohol, 20% allyl alcohol monopropoxylate, 11.8% t-butyl methacrylate, 3.8% styrene, and 60% butyl acrylate. It is dissolved in methyl amyl ketone (MAK, 70 g). To the resin solution is added polymeric HDI (54.7 g, Luxate® HT2090, Lyondell Chemical, 19.4 wt% NCO) and dibutyltin dilaurate (0.40 g, 2% solution in MAK). The coating formulation has 66.3% solids by weight and viscosity of 95 centistokes at 25° C. The coating composition is drawn down on steel panels to a uniform wet film of thickness 3 mils with a Bird type film applicator. The panels are dried in a hood at 25° C. The panels are tested after five days and give the following results: Gloss at 20°: 87; Gloss at 60°: 99; Pencil Hardness: B; Gardner Impact Direct: >168; Garner Impact Reverse: >168.

EXAMPLE 4

Urethane-Acrylic Coating With 80/20 Blend of Liquid Acrylic Polyol/Resinous Acrylic Polyol The formulation of Example 3 is repeated, but the panels, after 30 minutes of air dry, are baked in an oven at 135° C. for 30 min. The panels are tested after five days, and they have Gloss at 20°: 87; Gloss at 60°: 101; Pencil Hardness: B; Gardner Impact Direct: >168; Gardner Impact Reverse: >168.

COMPARATIVE EXAMPLE 5

Preparation of Comparative Acrylic Polyol Containing Both High-$T_g$ and Low-$T_g$ Acrylates Allyl alcohol (350 g), di-tert-butylperoxide (7.4 g), 2-ethylhexyl acrylate (low-$T_g$ monomer, 7.4 g), and methyl methacrylate (high-$T_g$ monomer, 128 g) are charged to a 1-liter stainless-steel reactor equipped with agitator, steam heating jacket, temperature controller, nitrogen inlet, vacuum distillation device, and addition pump. Di-tert-butylperoxide (22.2 g), 2-ethylhexyl acrylate (22.7 g), and methyl methacrylate (397 g) are mixed and charged into the addition pump. The reactor is purged three times with nitrogen, sealed, and the contents are heated to 135° C. The mixture of di-tert-butylperoxide, 2-ethylhexyl acrylate, and methyl methacrylate is pumped into the reactor during the polymerization at a decreasing rate. The addition rates are as follows: hour 1,143 g; hour 2, 111 g; hour 3, 80 g; hour 4, 61 g; hour 5, 47 g. The polymerization continues at 135° C. for an additional 30 minutes after completing the monomer addition. Unreacted monomers are removed by vacuum distillation by heating up to 160° C. The resulting acrylic polyol (615 g) has Mw: 4262, Mn: 1585, $T_g$: 30° C., and hydroxyl number: 123 mg KOH/g.

COMPARATIVE EXAMPLE 6

Urethane-Acrylic Coating From Comparative Acrylic Polyol of Example 5

A urethane-acrylic coating formulation of Example 3 is repeated but using the comparative acrylic polyol of Comparative example 5 instead of the polyol blend, and using 107 g instead of 70 g of MAK. It has 58% solids by weight at a viscosity of 95 centistokes at 25° C. The dried coating has: Gloss at 20°: 92; Gloss at 60°: 102; Pencil Hardness: H; Gardner Impact Direct: 120; Garner Impact Reverse: 108.

EXAMPLE 7

Urethane-Acrylic Coating With 90/10 Blend of Liquid Acrylic Polyol/SM-100 Resinous Polyol Liquid acrylic resin of Example 1 (90 g) and SM-100 resinous polyol (10 g, $T_g$: 62° C., Hydroxyl number: 218 mgKOH/g, Mn: 1500) are dissolved in a mixture of xylene (32.5 g) and ethyl acetate (32.5 g). To this resin solution is added polymeric HDI (56.7 g, Luxate HT 2090) and dibutyltin dilaurate (0.38 g, 2% solution in MAK). Solids content of the composition is 66.2% by weight at a viscosity of 95 centistokes at 25° C. The coating composition is drawn down on steel panels to a uniform wet film of thickness 3 mils with a Bird type film applicator. The panels are dried in a hood at 25° C. They are tested after five days and give the following results: Gloss at 20°: 87; Gloss at 60°: 100; Pencil Hardness: HB; Adhesion (ASM 3359): 5; Gardner Impact Direct: 144; Garner Impact Reverse:>160; Conical Mandrel Bend Test: 0.

EXAMPLE 8

Urethane-Acrylic Coating With 90/10 Blend of Liquid Acrylic Polyol/SM-100 Resinous Polyol Example 6 is repeated, but the panels, after 20 minutes of air-dried, are baked in an oven at 135° C. for 30 minutes. The panels are tested five days after baking: 20° gloss: 87; 60°gloss: 100; pencil hardness: F; adhesion (ASM 3359): 5; Garner Impact: 144 (direct) and: >160 (reverse); and Conical Mandrel Bend Test: 0.

COMPARATIVE EXAMPLE 9

Urethane-Acrylic Coating With Liquid Acrylic Polyol Only

Liquid acrylic polyol of Example 1 (150 g) is dissolved in MAK (88 g). To the resin solution is added HDI trimer (72.1 g, Luxate HT2090) and dibutyltin dilaurate (0.53 g, 2% in MAK). The coating formulation, containing 69.2% solids by weight, is drawn down on steel panels to a uniform wet film of thickness 3 mils with a Bird type film applicator. The panels are sticky (it cannot be cured) after 7 days in a hood at 25° C. or baked in an oven for 30 minutes at 135° C.

COMPARATIVE EXAMPLE 10

Urethane-Acrylic Coating With Resinous Polyol Only

SAA-100 resinous polyol (50 g) is dissolved in a mixture of xylene (67.3 g) and ethyl acetate (63.7 g). To the resin solution is added HDI trimer (44.1 g, Luxate HT2090) and dibutyltin dilaurate (0.45 g, 2% in MAK). The coating formulation, containing 40.0% solids by weight, is drawn down on steel panels to a uniform wet film of thickness 3 mils with a Bird type file applicator. The panels are cured in a hood at 25° C. for 7 days or baked in an oven for 30 minutes at 135° C. The coating film is too brittle to measure its physical properties.

EXAMPLE 11

Acrylic-Melamine Coating With 90/10 Blend of Liquid Acrylic Polyol/SM-100 Resinous Polyol Liquid acrylic polyol of Example 1 (63 g) and SM-100 resinous polyol (7 g) are dissolved in MAK (47 g). To this resin solution is added Cymel 303 melamine resin (30 g), Cycat 600 (p-toluene sufonic acid, product of Cytec,1.0 g) and Dow 57(silicon deformer, product of Dow Chemical, 0.05 g). Solids content of the composition is 68.3% by weight. Viscosity of the composition is 95 centistokes at 25° C. The coating is drawn down on steel panels to a uniform wet film of thickness 3 mils with a Bird type film applicator. The panels are air-dried in a hood for 30 min, and then baked in an oven at 80° C. for 30 minutes. The panels are tested after four days and give the following results: Gloss at 200: 90; Gloss at 60°: 101; Pencil Hardness: B; Adhesion (ASM 3359): 2; Gardner Impact Direct: 128; Gardner Impact reverse: 88; Conical Mandrel Bend Test: 0.

EXAMPLE 12

Acrylic-Melamine Coating With 80/20 Blend of Liquid Acrylic Polyol/SM-100 Resinous Polyol Liquid acrylic resin of Example 1 (56 g) and SM-100 (14 g) are dissolved in MAK (44 g). To this resin solution is added Cymel 303 melamine resin (30 g), Cycat 600 (1.0 g) and Dow 57 (0.05 g). Solids content of the composition is 69.8% by weight. Viscosity of the composition is 95 centistokes at 25° C. The coating composition is drawn down on steel panels to a uniform wet film of thickness 3 mils with a Bird type film applicator. The panels are air-dried in a hood for 30 minutes, and then baked in an oven at 80° C. for 30 minutes. The panels are tested after four days and give the following results: Gloss at 20°: 92; Gloss at 60°: 102; Pencil Hardness: H; Adhesion (ASTM 3359): 4; Gardner Impact Direct: 112; Gardner Impact Reverse: 152; Conical Mandrel Bend Test: 0.

We claim:

1. An ultra-high solids coating composition which comprises:
    (a) a polyol blend comprising a liquid acrylic polyol and a resinous polyol in a ratio within the range of 10/90 to 90/10 by weight; wherein the liquid acrylic polyol has Mn within the range of about 500 to about 10,000, hydroxyl number within the range of about 20 mg KOH/g to about 500 mg KOH/g, and a glass transition temperature ($T_g$) within the range of about −70° C. to about 0°C.; and the resinous polyol has Mn within the range of about 500 to about 10,000, hydroxyl number within the range of about 20 mg KOH/g to about 500 mg KOH/g, and $T_g$ greater than about 25° C.;
    (b) a crosslinker selected from the group consisting of multifunctional isocyanates, melamines, and silanes;
    (c) an organic solvent; and
    (d) optionally, a crosslinking catalyst;
    wherein the solids % is greater than about 65% by weight; said resinous polyol comprising:
    (i) from about 2% to about 60% by weight of recurring units of a hydroxyl functional monomer selected from the group consisting of allyl and methallyl alcohols, alkoxylated allyl and methallyl alcohols, and hydoxyalkyl acrylates and methacrylates;
    (ii) from about 40% to about 98% by weight of recurring units of a monomer selected from the group consisting of vinyl aromatics, and $C_1$ to $C_{20}$ alkyl, aryl, and cyclic acrylates and methacrylates whose homopolymers have a $T_g$ greater than or equal to 25° C.; and
    (iii) optionally, up to about 25% by weight of recurring units of a third monomer selected from the group consisting of vinyl halides, vinyl ethers, vinyl esters, acrylic and methacrylic acids, conjugated dienes, and mixtures thereof.

2. The composition of claim 1 wherein the liquid acrylic polyol comprises:
    (a) from about 2% to about 60% by weight of recurring units of a hydroxy-functional monomer selected from the group consisting of allyl and methallyl alcohols, alkoxylated allyl and methallyl alcohols, and hydoxyalkyl acrylates and methacrylates;
    (b) from about 40% to about 98% by weight of recurring units of a $C_1$, to $C_{20}$ alkyl acrylate or methacrylate whose homopolymer has a $T_g$ below about 25°C.; and
    (c) optionally, up to about 25% by weight of recurring units of a third monomer that is selected from the group consisting of vinyl aromatics, vinyl halides, vinyl ethers, vinyl esters, acrylic and methacrylic acids, unsaturated nitriles, conjugated dienes, and mixtures thereof.

3. The composition of claim 1 wherein the liquid acrylic polyol is a copolymer of n-butyl acrylate and an allylic alcohol selected from the group consisting of allyl and methallyl alcohols, ethoxylated allyl and methallyl alcohols of 1 to 5 oxyethylene units, propoxylated allyl and methallyl alcohols of 1 to 5 oxypropylene units, and mixtures thereof.

4. The composition of claim 1 wherein the liquid acrylic polyol is a copolymer of n-butyl acrylate and allyl propoxylate of 1 to 5 oxypropylene units.

5. The composition of claim 1 wherein the liquid acrylic polyol is a copolymer of n-butyl acrylate and a hydroxyalkyl acrylate or methacrylate selected from the group consisting of hydroxyethyl acrylate and methacrylate, hydroxypropyl acrylate and methacrylate, hydroxybutyl acrylate and methacrylate, and mixtures thereof.

6. The composition of claim 1 wherein the liquid acrylic polyol is a copolymer of n-butyl acrylate and hydroxypropyl acrylate.

7. The composition of claim 1 wherein the resinous polyol is a copolymer of styrene and an allylic alcohol selected from the group consisting of allyl alcohol, ethoxylated allyl alcohols of 1 to 5 oxyethylene units, propoxylated allyl alcohols of 1 to 5 oxypropylene units, and mixtures thereof.

8. The composition of claim 1 wherein the resinous polyol is a copolymer of styrene and allyl alcohol.

9. The composition of claim 1 wherein the resinous polyol is a copolymer of styrene and a hydroxyalkyl acrylate or methacrylate selected from the group consisting of hydroxyethyl acrylate and methacrylate, hydroxypropyl acrylate and methacrylate, and mixtures thereof.

10. The composition of claim 1 wherein the resinous polyol is a copolymer of styrene and hydroxyethyl acrylate.

11. The composition of claim 1 wherein the multifunctional isocyanate is selected from the group consisting of 1,6-hexamethylene diisocyanate (HDI), polymeric HDIs, isophorone diisocyanate (IPDI), polymeric IPDIs, and HDI- or IPDI-based isocyanate-terminated prepolymers of polyethers, polyesters, or acrylic resins.

12. The composition of claim 1 wherein the organic solvent is selected from the group consisting of ethers, esters, ketones, aromatic and aliphatic hydrocarbons, glycol ethers, glycol ether esters, and mixtures thereof.

13. A two-component ultra-high-solids acrylic urethane coating composition that comprises:
  (a) Component A, which comprises a blend of a liquid acrylic polyol and a resinous polyol, wherein the liquid acrylic polyol has Mn within the range of about 500 to about 10,000, hydroxyl number within the range of about 20 mg KOH/g to about 500 mg KOH/g, and $T_g$ within the range of about −70° C. to about 0° C.; and the resinous polyol has Mn within the range of about 500 to about 10,000, hydroxyl number within the range of about 20 mg KOH/g to about 500 mg KOH/g, and $T_g$ greater than or equal to 25° C.; and
  (b) Component B, which comprises a multifunctional isocyanate selected from the group consisting of 1,6-hexamethylene diisocyanate (HDI), polymeric HDIs and adducts, isophorone diisocyanate (IPDI), polymeric IPDIs and adducts, and HDI- or IPDI-based isocyanate-terminated prepolymers of polyethers, polyesters, or acrylic resins;
  wherein the NCO/OH ratio of the A and B components is within the range of 0.8 to 1.2, and the solids % of the combination of Component A and B is greater than or equal to 65% by weight.

14. The composition of claim 13 wherein the liquid acrylic polyo is a copolymer of n-butyl acrylate and propoxylated allyl alcohol.

15. The composition of claim 13 wherein the resinous polyol is a copolymer of styrene and allyl alcohol.

16. The composition of claim 13 wherein the ratio of the liquid acrylic polyol to the resinous polyol is within the range from 80/20 to 20/80 by weight.

17. An ultra-high-solids acrylic-melamine coating composition that comprises:
  (a) a blend of a liquid acrylic polyol and a resinous polyol, wherein the liquid acrylic polyol has Mn within the range of about 500 to about 10,000, hydroxyl number within the range of about 20 mg KOH/g to about 500 mg KOH/g, and $T_g$ within the range of about −70° C. to about 0° C.; and the resinous polyol has Mn within the range of about 500 to about 10,000, Hydroxyl number within the range of about 20 mg KOH/g to about 500 mg KOH/g, and $T_g$ greater than or equal to 25° C.;
  (b) a melamine crosslinker; and
  (c) an organic solvent;
  wherein the ratio of polyol blend to melamine is within the range of about 1/1 to about 15/1, and the solids % is greater than or equal to 65% by weight; said resinous polyol comprising:
    (i) from about 2% to about 60% by weight of recurring units of a hydroxyl functional monomer selected from the group consisting of allyl and methallyl alcohols, alkoxylated allyl and methallyl alcohols, and hydoxyalkyl acrylates and methacrylates;
    (ii) from about 40% to about 98% by weight of recurring units of a monomer selected from the group consisting of vinyl aromatics, and $C_1$ to $C_{20}$ alkyl, aryl, and cyclic acrylates and methacrylates whose homopolymers have a $T_g$ greater than or equal to 25° C.; and
    (iii) optionally, up to about 25% by weight of recurring units of a third monomer selected from the group consisting of vinyl halides, vinyl ethers, vinyl esters, acrylic and methacrylic acids, conjugated dienes, and mixtures thereof.

18. The composition of claim 17 wherein the liquid acrylic polyol is a copolymer of n-butyl acrylate and a propoxylated allyl alcohol of 1 to 5 oxypropylene units.

19. The composition of claim 17 wherein the resinous polyol is a copolymer of styrene and allyl alcohol.

20. The composition of claim 17 wherein the ratio of the liquid acrylic polyol to the resinous polyol is within the range from 80/20 to 20/80 by weight.

* * * * *